April 12, 1938.  M. M. HARRISON  2,113,728
METHOD OF LINING HOLLOW CONTAINERS
Filed May 1, 1936
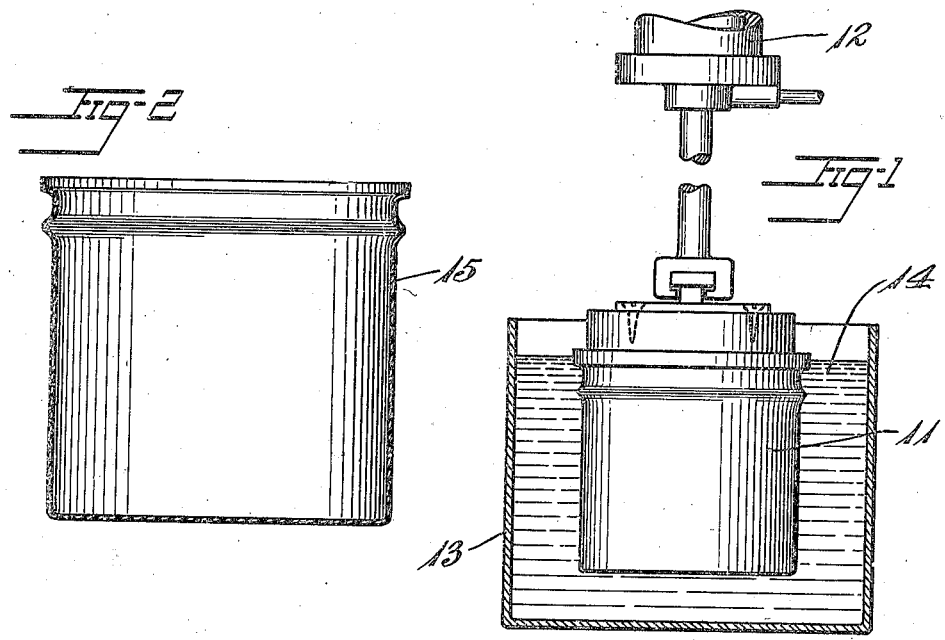
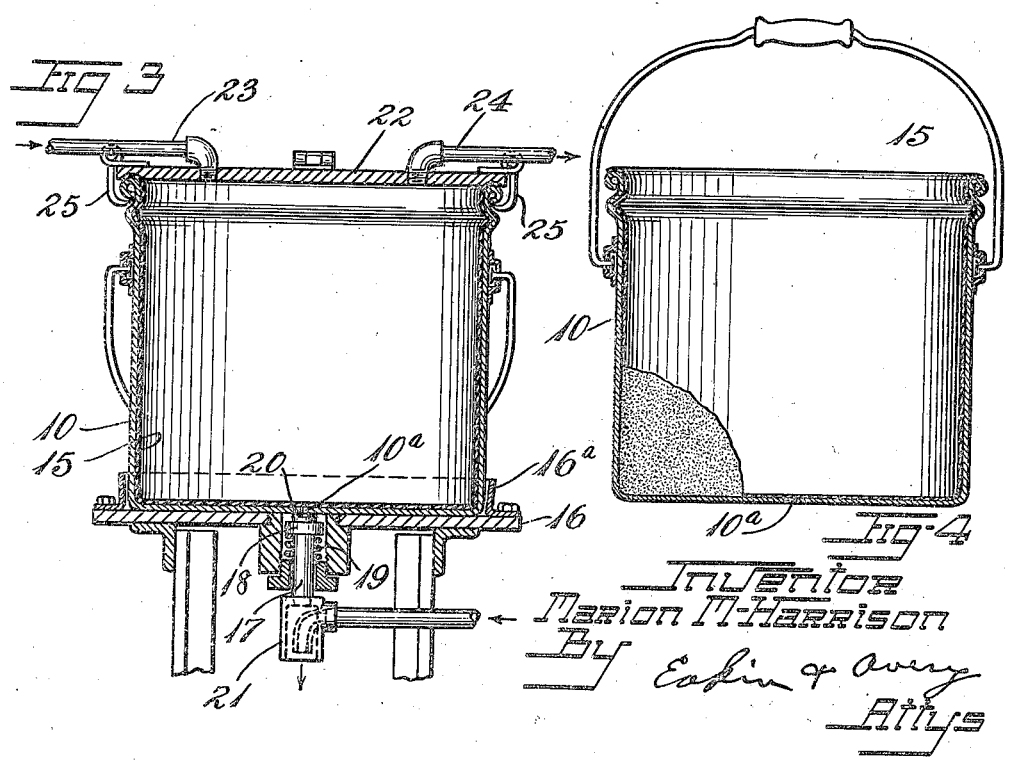
Inventor
Marion M. Harrison
By Eadin & Avery
Attys Patented Apr. 12, 1938

2,113,728

UNITED STATES PATENT OFFICE 2,113,728

METHOD OF LINING HOLLOW CONTAINERS

Marion M. Harrison, Akron, Ohio, assignor to The B. F. Goodrich Company, New York, N. Y., a corporation of New York Application May 1, 1936, Serial No. 77,307

2 Claims. (Cl. 18—59)

This invention relates to methods of lining hollow articles with rubber and is especially useful in the manufacture of metal rubber lined battery jars, acid containers, and the like.

The principal objects of the invention are to provide a one piece lining and to accomplish the placing of such a lining within a hollow rigid article with simplicity, economy and efficiency.

Other objects will appear from the following description and the accompanying drawing.

Of the drawing:

Fig. 1 is an elevation of a dipping form suspended by an air hoist in a tank containing a dispersion of rubber, and illustrating the forming of the one-piece lining, the tank being shown in section and the air hoist being partly broken away.

Fig. 2 is a sectional elevation of the rubber lining.

Fig. 3 is a vertical sectional view of the preferred form of apparatus for drawing the rubber lining into place and vulcanizing the lining.

Fig. 4 is a sectional view of the lined hollow article, part of the lining being broken away to show the container wall.

Referring to the drawing, the numeral 10 designates a rigid, hollow article, a pail being shown, which is to be lined with a seamless rubber lining. A dipping form 11 is prepared of such dimensions that when covered with the desired thickness of rubber the outside dimensions of the deposited rubber will be the same as the internal dimensions of the hollow article. The form 11 is made of such depth however that the deposited rubber lining will extend above the hollow article to permit its being turned back over the margin of the open end of the article.

By means of an air hoist 12, or other suitable lifting means, the form is lowered into a receptacle 13 containing a liquid dispersion 14 of rubber.

Rubber is deposited upon the form until a lining 15 of the desired thickness is formed. Preferably, the depositing of the rubber is accomplished by the well known coagulant dip method from an aqueous dispersion of rubber but it may also be accomplished by electro deposit from an aqueous dispersion or by deposit from a dispersion of rubber in a solvent.

To provide for inserting the lining in the container, a small aperture 10a is drilled through the bottom of the container 10, preferably at its center. The container is placed on a bench 16 having a locating flange 16a fixed thereto and corresponding in size and shape to the bottom of the container. A pipe 17 extends into an aperture formed in the bench and is provided with a telescoping sleeve 18 slidably mounted thereon and normally held in an elevated position by a coil spring 19. A gasket 20 carried by the sleeve 18 contacts with the bottom of the container to seal the pipe to the container in communication with the aperture 10a. Any means, such as an ejector 21, is used to reduce the air pressure in the pipe 17 to provide a partial vacuum. After the container has been placed upon the bench, a coating of rubber cement, preferably containing an isomer of rubber adapted to induce adhesion between rubber and metal, is applied to the surface to be lined. The lining is also similarly coated on its outer surface. The lining is then inserted in the container and the partial vacuum together with the lubricating properties of the cement, which has not been permitted to dry, causes the lining to be drawn into place.

Vulcanization is accomplished by applying a cover 22 over the mouth of the container and circulating steam or hot water through the container by means of pipes 23, 24 which are fixed to the cover. Swing clamps 25, hinged to the cover, engage under the rim of the container and hold the cover in place.

After vulcanization of the lining the aperture 10a in the container may be closed by use of solder or otherwise.

I claim:

1. The method of lining a pocket in a hollow article which comprises forming a separate rubber lining corresponding substantially to the pocket in size and shape, applying a lubricating coat of adhesive to one of the contacting surfaces of the pocket and the pocket lining, entering the lining in the mouth of the pocket, and drawing the lining into place while the adhesive is wet by evacuating the air from between the article and the lining.

2. The method of lining a pocket in a hollow article which comprises forming a separate seamless rubber lining having side walls and an end wall corresponding substantially to the pocket in size and shape by deposit from a liquid dispersion of rubber, applying a lubricating coat of adhesive to one of the contacting surfaces of the pocket and the pocket lining, entering the lining in the mouth of the pocket, and drawing the lining into place while the adhesive is wet by evacuating the air from between the article and the lining.

MARION M. HARRISON.